(12) United States Patent
Justice

(10) Patent No.: US 7,862,713 B2
(45) Date of Patent: Jan. 4, 2011

(54) RESERVOIR WATER FILTRATION SYSTEM

(76) Inventor: Donald Justice, #9 N. Del Prado Blvd., Cape Coral, FL (US) 33990

( * ) Notice: Subject to any disclaimer, the term of this patent is extended or adjusted under 35 U.S.C. 154(b) by 99 days.

(21) Appl. No.: 12/382,784

(22) Filed: Mar. 24, 2009

(65) Prior Publication Data

US 2010/0243547 A1    Sep. 30, 2010

(51) Int. Cl.
*B01D 24/02* (2006.01)
*E03B 3/04* (2006.01)

(52) U.S. Cl. .................. 210/170.09; 210/266; 210/291; 405/127; 405/158; 405/177; 405/184.1

(58) Field of Classification Search ............ 210/170.08, 210/170.09, 190.1, 170.11, 266; 405/43, 405/50, 127, 158, 174, 177, 183.5, 184, 184.1
See application file for complete search history.

(56) References Cited

U.S. PATENT DOCUMENTS

| | | | |
|---|---|---|---|
| 623,782 A | 4/1899 | Hammett | |
| 842,696 A * | 1/1907 | Pfeiffer | 210/170.1 |
| 975,450 A * | 11/1910 | Ouimet | 210/170.09 |
| 1,805,993 A * | 5/1931 | Miller | 210/170.09 |
| 3,483,983 A * | 12/1969 | Lindstrom | 210/170.09 |
| 4,871,281 A | 10/1989 | Justice | 405/181 |
| 4,927,292 A | 5/1990 | Justice | 405/43 |
| 4,950,103 A | 8/1990 | Justice | 405/43 |
| 4,971,690 A | 11/1990 | Justice | 210/170 |
| 5,059,064 A | 10/1991 | Justice | 405/37 |
| 5,072,972 A | 12/1991 | Justice | 285/373 |
| 5,118,230 A | 6/1992 | Justice | 405/128 |
| 5,143,623 A | 9/1992 | Kroll | 210/705 |
| 5,252,226 A | 10/1993 | Justice | 210/739 |
| 5,685,668 A | 11/1997 | Justice | 405/267 |
| 6,076,994 A | 6/2000 | Brockway et al. | 405/127 |
| 6,095,719 A * | 8/2000 | Miya et al. | 405/127 |
| 6,241,877 B1 * | 6/2001 | Berkey | 210/170.09 |
| 6,540,910 B2 * | 4/2003 | Schwarzenegger et al. | 210/170.08 |
| 6,978,804 B2 * | 12/2005 | Quigley et al. | 405/184 |
| 7,241,382 B2 | 7/2007 | Gordon | 210/209 |
| 2006/0191845 A1 | 8/2006 | Haudenschild | 210/601 |

* cited by examiner

*Primary Examiner*—Christopher Upton
(74) *Attorney, Agent, or Firm*—Jacobson Holman PLLC

(57) ABSTRACT

A system for reuse of water stored in a reservoir by transfer of initially filtered water from the reservoir to a vertically stacked filtration system located onshore. A flexible filter screened, porous feeder line housed within a perforated carrier pipe extends into the reservoir and is supported above the bottom of the reservoir for transfer of filtered water to the vertically stacked filtration system. The flexible filter screened, porous feeder line includes a conveyance system for retraction and extension of the porous feeder line by two cables. The feeder line is movable from the perforated carrier pipe for cleaning or replacement of the porous feeder line.

14 Claims, 6 Drawing Sheets

RESERVOIR WATER FILTRATION SYSTEM

FIELD OF THE INVENTION

The present invention provides for use of storm runoff water that has been filtered to an acceptable particle limit.

BACKGROUND OF THE INVENTION

The solution to water shortages for water users of any kind from Florida, other states and countries of the world is to recycle or reuse water. Water for irrigation makes up about 80% of water use worldwide.

One of the most abundant sources of water for re-use for irrigation is storm water runoff that has been stored in surface ponds or groundwater aquifers. After rainfall occurs, excess water not absorbed by the ground travels into ditches, ponds, or lakes. When these receptors of storm water runoff are filled, the storm water will overflow into other bodies of water and finally make its way to the saline water bodies of the world.

If this source of storm water runoff could be filtered to acceptable standards it could be directly reused from storage for many purposes. The filtered water also can be introduced into water reuse mains and widely reused with reclaimed water for irrigation.

One of the specifications for some parts of the world is to allow water for irrigation that has a total of suspended solids that is less than an acceptable value. An example of such a level is less than 5 mg of suspended solids per liter.

SUMMARY OF THE INVENTION

The present invention includes a filter system that will deliver filtered water within or well below the spec of less than 5 mg of suspended solids per liter. The main parts of the filter system can also be removed from the body of water, cleaned and reused.

The filter system consists of two or more porous pipelines or well screens of any diameter installed in a same trench and vertically separated by 3½ feet to 15 of sand filter pack. The uppermost pipeline is at an elevation that is approximately three feet to 20 feet below the existing lake level.

Filter screened, porous feeder lines extend into the lake and are connected to the uppermost pipeline. Each feeder line is approximately 60 to 500 feet in length. The feeder line is used to filter the gravity fed water from the pond or lake into the uppermost pipeline. A filter media pack of sand or other filter media material is installed between the lowest pipeline and each successively higher pipeline.

The uppermost filter pipeline is connected to the lake feeder lines and supplies water by gravity flow to the successively lower at least one filter pipeline. The water is filtered as the water passes by gravity flow to a deepest filter pipeline for collection. The filtered water would be mixed with filtered water from successively higher filter pipelines and pumped from the lowest collection filter pipeline to an irrigation system through a pumping riser.

A special filter media is used to enhance removal of contaminates from the storm water stored within a lake and is used with this system in any location where it is necessary to enhance the quality of the storm water. Water coming from the lake is moved by gravity flow and is filtered at least six times before being pumped into the irrigation system.

The filter system of the present invention can be cleaned in many ways. The filter system can be cleaned by flushing with clean water from another source introduced into the pumping station riser. The filter system can also be cleaned by chemical injection, and can also be cleaned by extracting from the lake the flexible filter screened feeder lines and replacing a flexible filter screened feeder line with another cleaned or new flexible filter screened feeder line.

Construction of the reclaimed reservoir water filtration system of the present invention is completed in such a way as to allow for extraction, cleaning and replacement of the lake feeder portion of the system. The porous screens that extend into the lake are housed within a porous carrier pipe that allows the porous feeder line to be inserted into the carrier pipe through a maintenance access box constructed on the shore.

A filter extraction machine is attached to the porous feeder line at the access box. The porous feeder line is withdrawn from the carrier pipe and rolled onto a reel of a filter cleaning and delivery truck to allow for easy handling and transporting elsewhere to be cleaned and prepared for reuse. Alternatively, the porous filter line is fed through a portable filter cleaning machine, cleaned to an acceptable level and reinserted into the carrier pipe and into the pond or lake, ready for use once again.

The lake feeder lines are constructed by extension of a perforated PVC carrier pipe into the body of water from the maintenance access box. The carrier pipe extends from the maintenance access box to the uppermost filter pipeline and intersects the uppermost filter pipeline with a tee that is part of the carrier system. The sides of the tee that are perpendicular to the carrier pipe are connected to a porous filtered screen pipeline in such a way that will allow a flexible filter, porous feeder line to be inserted through the maintenance access box into the carrier pipe and through the tee and through a seal and further into the porous carrier pipe portion that extends into the lake. The tee is constructed with a seal on a side of the tee closest to the lake to allow the flexible filter, porous feeder line to enter the carrier pipe that extends into the lake or pond without letting water that enters into the carrier pipe enter the uppermost filter pipeline except through the flexible, porous, screened feeder line.

The carrier pipe extends through and past the tee into the pond or lake and is porous in a portion located in the lake or extending from the pond shore. The carrier is constructed in such a way that it will not lay directly on the bottom of the pond or lake but will rest on legs anchored by weights that will keep the carrier pipe at least 3 to 10 feet from the bottom of the body of water.

A small cable way pipe is attached to the top of the carrier pipe system to house a ¼ inch stainless steel cable. The cable is used for the deployment of the flexible filter screened, porous feeder line into the carrier pipe.

Once the carrier pipe is in place, the flexible filter screened, porous feeder line is hooked to the cable deployment system. A winch is operated to cause the flexible filter screened, porous feeder line to be inserted into the carrier pipe through the maintenance access box, through the tee, through the seal and into the carrier pipe in the pond or lake to allow the water filtration process to begin.

Filtration of the water from the pond or lake is achieved by passage of the water into the perforated portion of the PVC carrier pipe. Housed within the carrier pipe is the flexible high density polyethylene porous feeder line with a double filter sock. The water filtered into the interior of the flexible filter screened, porous feeder line, is conveyed to an uppermost filter pipeline buried onshore at a tee intersection with an eight inch diameter flexible high density polyethylene perforated pipe with double filter sock.

Water passing from the uppermost filter pipeline migrates by gravity through a sand filter pack to at least one vertically lower filter pipeline. The lowermost filter pipeline also is an eight inch diameter flexible high density polyethylene perforated pipe with double filter sock. The lowermost filter pipeline conveys the filtered water to a reservoir transfer pump to transfer filtered water for subsequent reuse.

The operation of the present invention is automatic and continuous. Periodic maintenance is only required for cleaning of the flexible filter screened, porous feeder line located internally of the carrier pipe which extends into the pond or lake. Two cables are connected to opposite ends of the flexible filter screened, porous feeder line. One cable is operated at one end by a reel system of a filter cleaning and delivery truck for removal of the flexible filter screened, porous feeder line from the carrier pipe. Another cable is moved by a winch located in a maintenance access box to pull a new or cleaned flexible filter screened, porous feeder line off of a reel on the filter cleaning and delivery truck. A cap sealing the distal end of the flexible filter screened, porous feeder line cooperates with a terminal end of the cable to anchor the distal end of the flexible filter screened, porous feeder line to the cable.

Accordingly, it is an object of the present invention to provide a system for reuse of water stored in a reservoir by transfer of initially filtered water from the reservoir to a vertically stacked filtration system located onshore.

It is another object of the present invention to provide a system for reuse of water stored in a reservoir by transfer of initially filtered water from the reservoir to a vertically stacked filtration system located onshore with at least two horizontally extending, vertically stacked filter pipelines separated by a sand filter pack with each of the filter pipelines including a double filter sock surrounding a filter pipeline for transfer of successively filtered water to the lowermost filter pipeline.

It is still yet another object of the present invention to provide a system for reuse of water stored in a reservoir by transfer of initially filtered water from the reservoir to a vertically stacked filtration system located onshore with a flexible filter screened, porous feeder line housed within a perforated carrier pipe extending into the reservoir and supported above the bottom of the reservoir for transfer of filtered water to an onshore further filtration system.

It is still yet another object of the present invention to provide a system for reuse of water stored in a reservoir by transfer of initially filtered water from the reservoir to a vertically stacked filtration system located onshore with a flexible filter screened, porous feeder line housed within a perforated carrier pipe extending into the reservoir and supported above the bottom of the reservoir for transfer of filtered water to an onshore further filtration system and the flexible filter screened, porous feeder line including a conveyance system for retraction and extension of the porous feeder line by two cables into and out of the perforated carrier pipe for cleaning or replacement of the porous feeder line.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the reservoir water filtration system disclosed herein, and are for illustrative purposes only. Other embodiments that are substantially similar can use other components that have a different appearance.

DETAILED DESCRIPTION OF THE PREFERRED EMBODIMENTS

Figure 1:
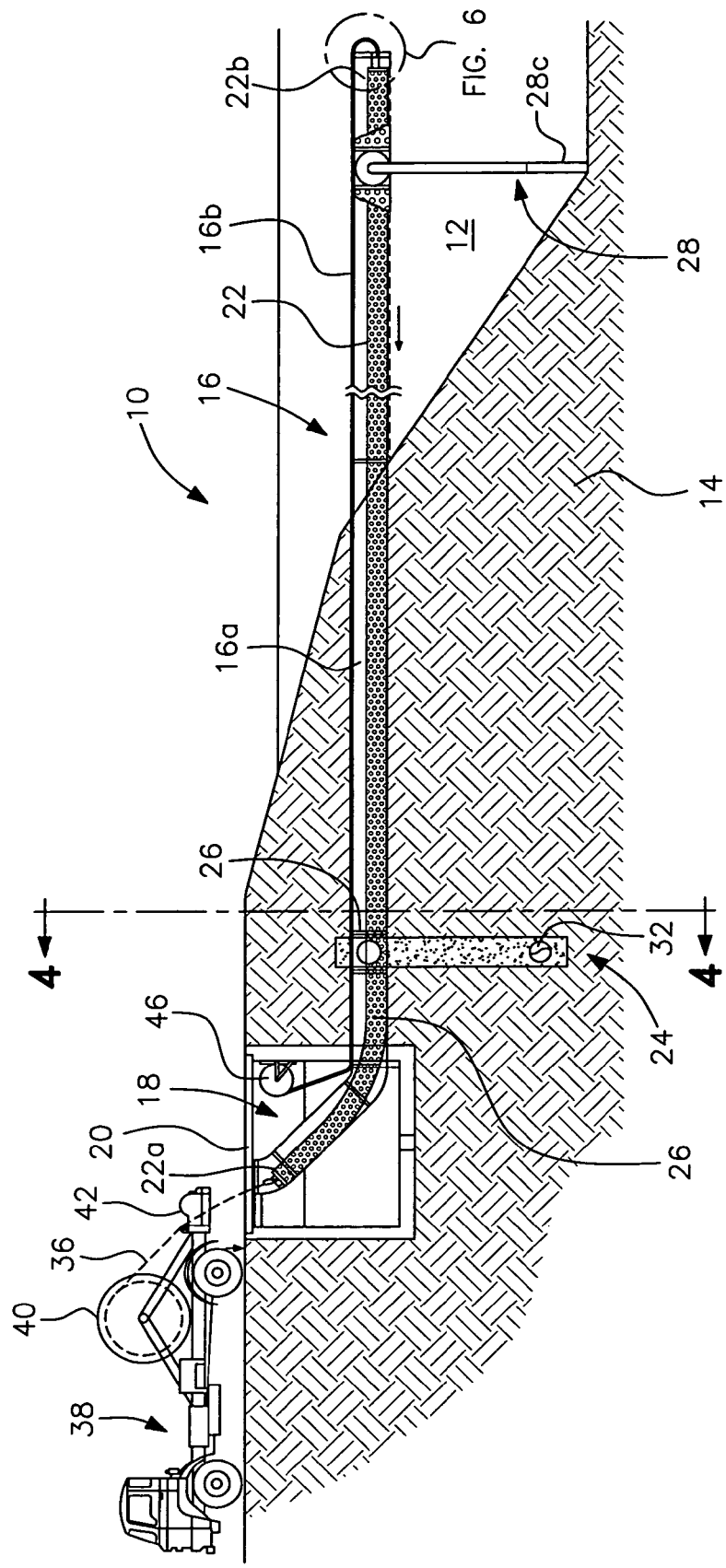
FIG. 1 is a schematic illustration of the reservoir water filtration system of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
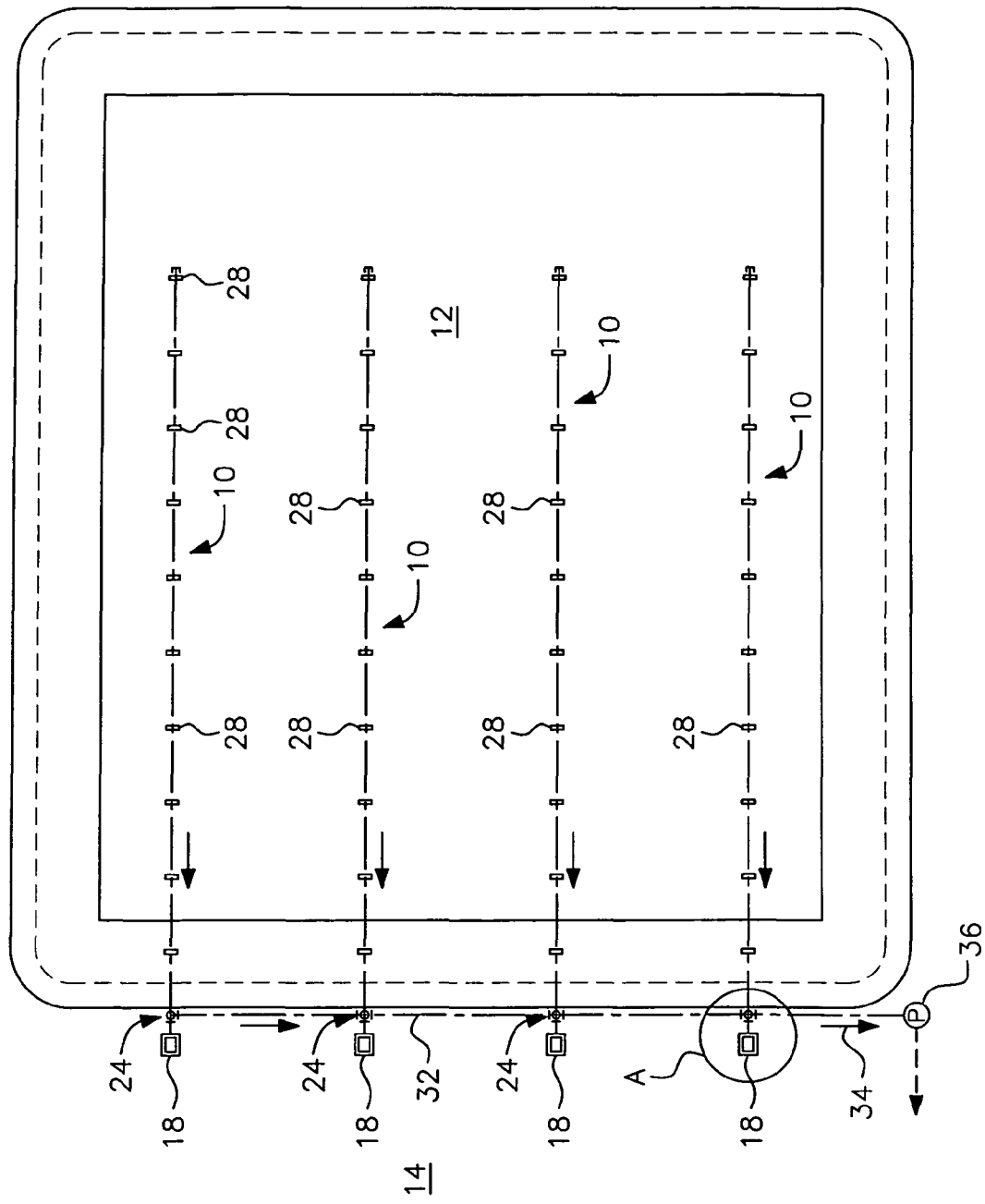
FIG. 2 is a plan view of a water reservoir including schematic illustration of a plurality of carrier pipes extending into the water.

With reference to the drawings, in general, and to FIGS. 1 and 2, in particular, a reservoir water filtration system embodying the teachings of the subject invention is generally designated as 10. With reference to its orientation in FIG. 1, the filtration system extends between a body of water 12 and the land 14 surrounding the body of water.

As shown in FIG. 1, a carrier pipe 16 extends from the shore 14 into the body of water 12. The carrier pipe 16 includes a solid pipe section 16a which is located on the shore and perforated pipe section 16b which extends into the water. The solid pipe section 16a extends into, at a terminal end, a maintenance access box 18 having a hinged cover 20.

Extending throughout the carrier pipe 16 is a filter screened, porous feeder line 22. The feeder line 22 is surrounded by a double filter sock. The feeder line 22 extends through the carrier tube and into a horizontal filter system 24. The feeder tube passes through rubber seals 26 located on opposite sides of the horizontal well filter system, which will be explained in more detail with reference to FIG. 4.

As shown in FIG. 2, a plurality of reservoir water filtration systems 10 extend from the shore 14 into the water 12. The perforated carrier pipe section 16b is supported in the water by pipe stand supports 28. The pipe stand supports elevate the carrier pipe to a height at least four feet from the uppermost level of the water. The carrier pipe 16 is typically spaced 100 feet apart with each pipe stand being spaced approximately 60 feet. The support stands 28 include legs 28a, 28b filled at a bottom portion with at least two feet of concrete 28c.

Figure 4:
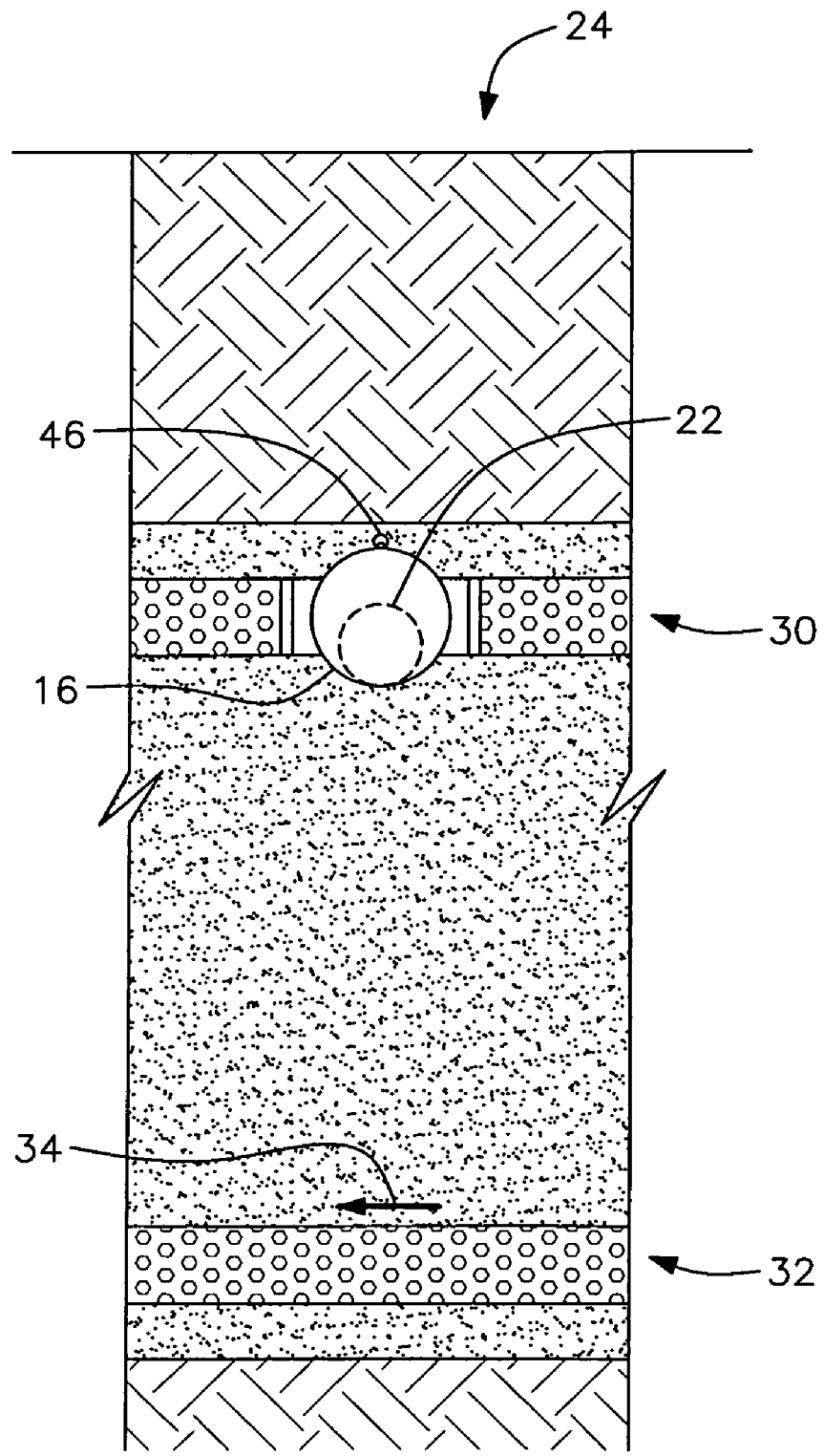
FIG. 4 is an enlarged cross-sectional view of an onshore filtration system taken along line 4-4 in FIG. 1.

With reference to FIG. 4, an illustration is provided of the interconnection of the carrier pipe 16 and feeder line 22 intersecting the horizontal well filter system 24. This arrangement is repeated for each carrier pipe 16 as shown in FIG. 2.

In FIG. 4, the carrier pipe 16 containing the interior feeder line 22 intersects an uppermost filter pipeline 30 formed of an eight inch diameter flexible high density polyethylene perforated pipe with double filter sock. At this intersection, the carrier pipe 16 is perforated so as to allow transfer of water from the feeder line 22 to the filter pipeline 30. The filter pipeline 30 extends horizontally in opposite directions to allow water to flow as indicated by arrow 32.

As the water passes through the perforated pipeline 30, the water passes through a double filter sock and into a sand filter pack completely surrounding the pipeline 30. The sand filter pack is held within a filter fabric wrap.

Figure 5:
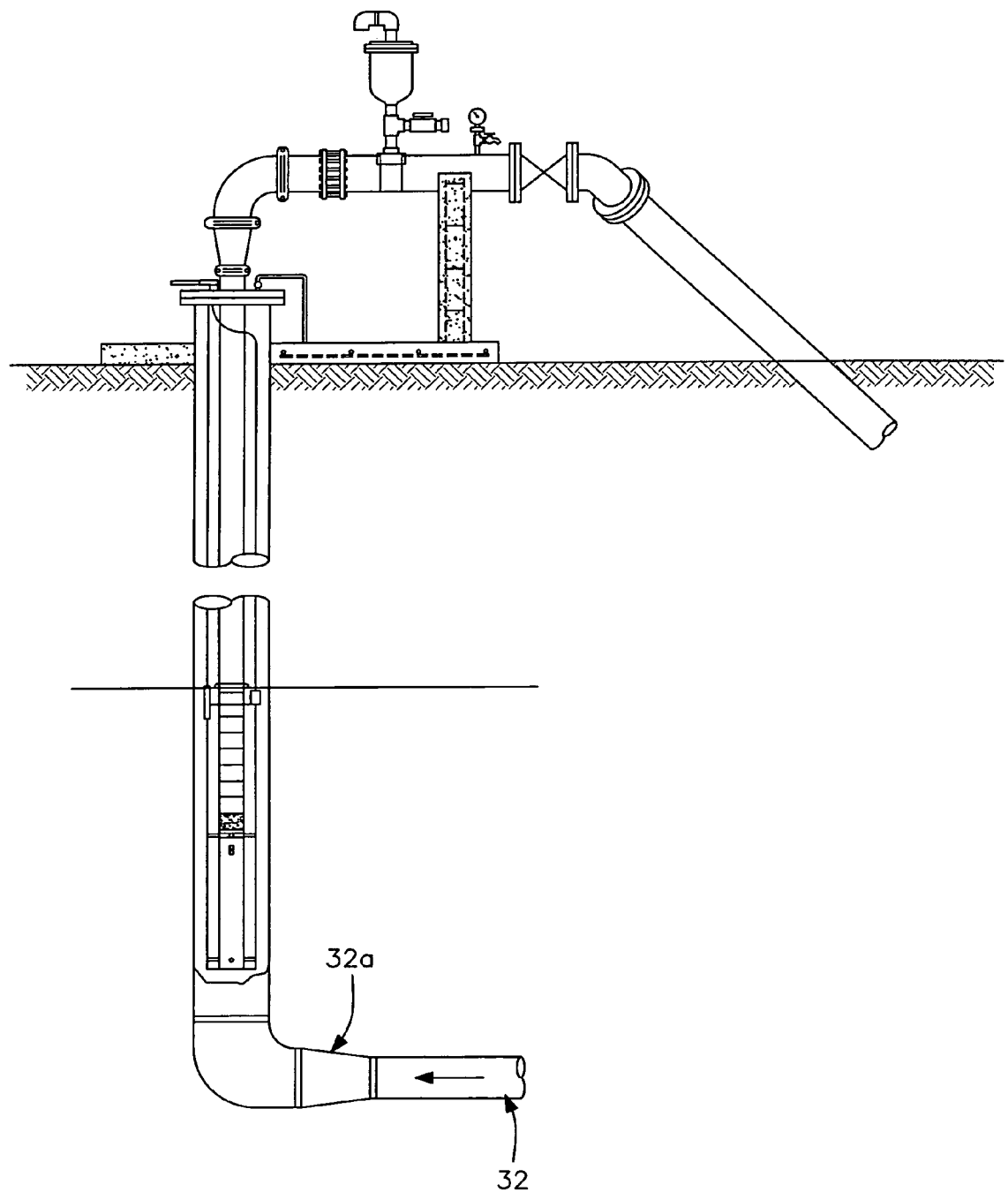
FIG. 5 illustrates details of a reservoir transfer pump.

Water migrates, by gravity, into a successively lower series of parallel, horizontally extending pipelines. At least one additional pipeline 32 is present for collecting filtered water passing through the sand filter pack. The pipeline 32 is also an eight inch diameter, flexible high density polyethylene pipeline having a double filter sock. Water collected in pipeline 32 is transferred in the direction of arrow 34 due to its inclination until ultimately received in a transfer and discharge pump 36 as schematically illustrated in FIG. 2 and in greater detail in FIG. 5.

The water transmitted by lowermost pipeline 32 has been filtered numerous times including through the double filter sock of the feeder line 22, the double filter sock of the pipeline 30 and the double filter sock of the pipeline 32. In addition, the water is filtered through the sand filter pack surrounding the at least two pipelines 30, 32. Water reaching the transfer pump at terminal end 32a of the pipeline 32 is sufficiently filtered for subsequent reuse, at least for irrigation purposes.

Figure 3:
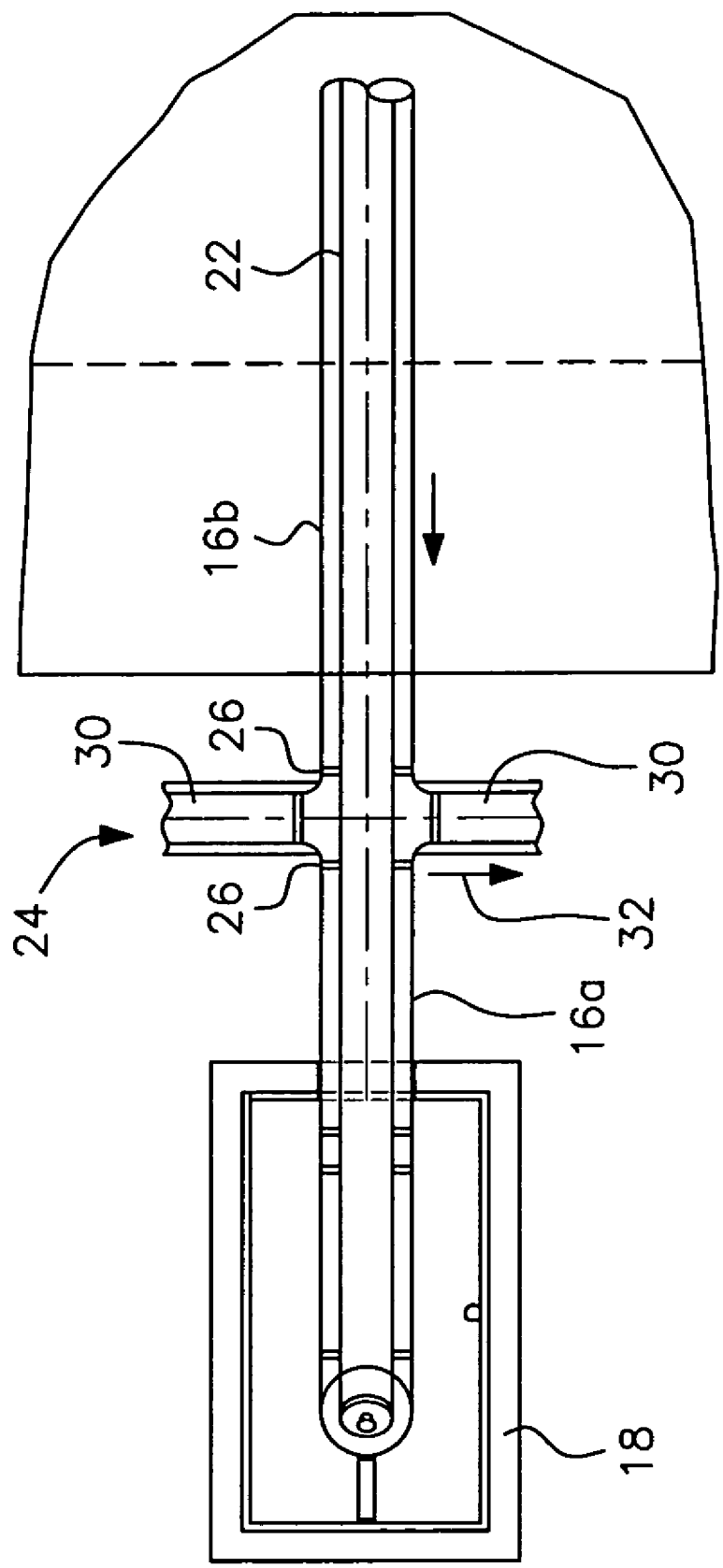
FIG. 3 is an enlarged detailed view of the area encircled in FIG. 2 and labeled as A.

An additional feature of the present invention will be explained with reference to FIGS. 1, 3 and 6. It is understood that the heaviest concentration of particulate matter will be found in the water contained within the body of water 12. Accordingly, the feeder lines 22 will have occasion to be clogged by solid particles. Therefore, a ¼ inch diameter stainless steel cable 36 is connected at end 22a of the feeder line 22. This connection is located in the end of the carrier pipe housed within the maintenance access box 18. A truck 38 including a supply reel 40 rotates the reel so as to wind the cable 36 onto the reel and pull the feeder line 22 out from the carrier pipe 16. Upon complete winding of the feeder line onto the reel 40, the truck may transport the feeder line to a remote location for cleaning or replacement.

Alternatively, a flexible perforated pipe cleaning machine 42 may be located on the truck 38 for cleaning of the feeder line as the feeder line is pulled from the maintenance access box 18.

Figure 6:
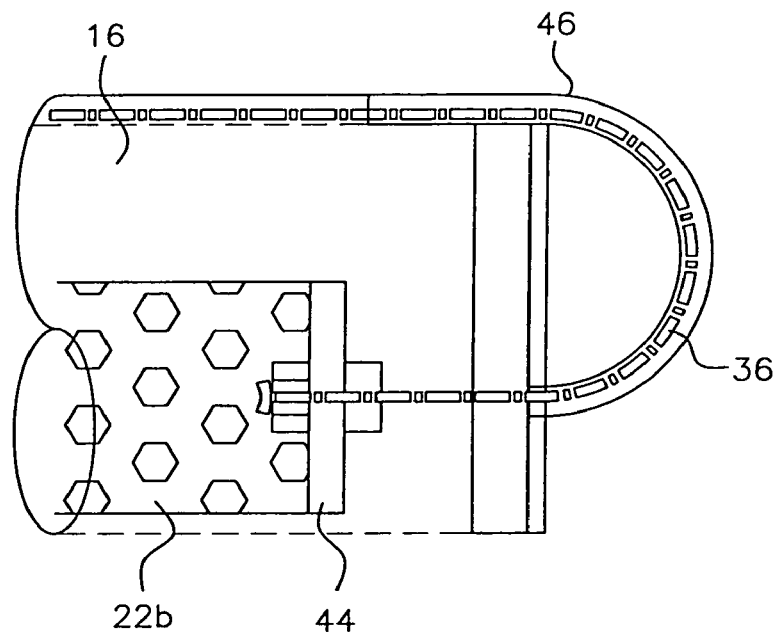
FIG. 6 is an enlarged detail of the end of the carrier pipe illustrating the internal flexible filter screened, porous feeder line and attached cable.
Figure 7:
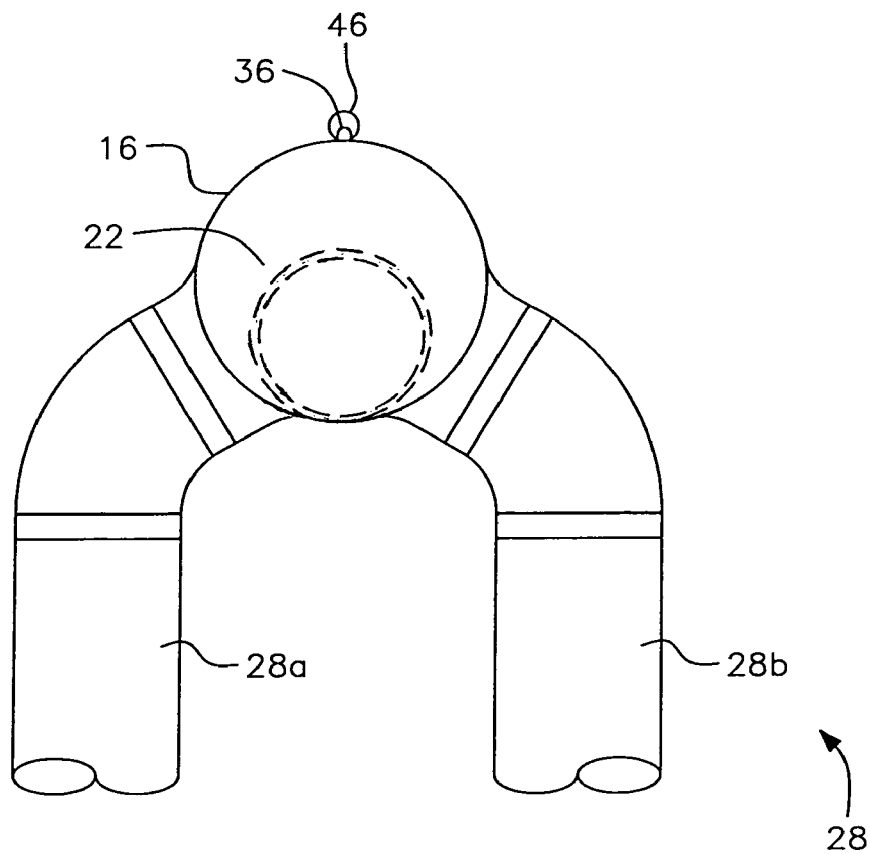
FIG. 7 is an enlarged detail of a pipe stand located spaced along the carrier pipe in the reservoir for supporting the carrier pipe above the bottom of a body of water.

At the opposite end 22b of the feeder line, and as shown in greater detail in FIG. 6, another cable 36 is connected within a cap 44 for anchoring to the end 22b of the feeder line. This cable 36 is fed through a one inch diameter rigid metal tubing which extends on top of the carrier pipe 16 for a majority of its length until reaching the maintenance access box 18. In the maintenance access box is located a winch 46 which may be manually or electronically operated.

When a new or cleaned feeder line is to be extended into the carrier pipe 16, the winch 46 is operated to draw the end 22b of the feeder line into the maintenance access box 18 and into the carrier pipe 16 which is located in the maintenance access box. The continued operation of the winch will extend the feeder line throughout the length of the carrier pipe. This provides an easy introduction of a new or cleaned feeder line into position inside the carrier pipe.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A reservoir filtration system comprising
a carrier pipe extending from land into a body of water,
a feeder line located inside of said carrier pipe, said feeder line being porous, and
a horizontal well filter system, said carrier pipe and feeder line extending through said horizontal well filter system for transfer of water from the body of water into said horizontal well filter system to provide filtered water from the horizontal well filter system.

2. The filtration system of claim 1, wherein a portion of said carrier pipe is perforated and another portion of said carrier pipe is non-perforated.

3. The filtration system of claim 2, further comprising a cable system for moving the feeder line into and out of said carrier pipe.

4. The filtration system of claim 3, wherein said cable system includes two cables connected to opposite ends of the feeder line, respectively.

5. The filtration system of claim 4, wherein a first one of the two cables is connected to a reel mounted on a truck.

6. The filtration system of claim 5, wherein the first cable is connected to one end of the feeder line in a maintenance access box located on land.

7. The filtration system of claim 5, wherein the truck includes a cleaning machine for cleaning the feeder line as the feeder line is loaded onto the reel.

8. The filtration system of claim 4, wherein a second one of the two cables extends along the carrier pipe and is connected to a distal end of the feeder line.

9. The filtration system of claim 8, wherein said second cable is connected to a winch located in a maintenance access box located on land.

10. The filtration system of claim 1, wherein said horizontal well system includes at least two vertically spaced filter pipelines separated by filter media.

11. The filtration system of claim 10, wherein said filter media is a sand filter pack.

12. The filtration system of claim 1, wherein a plurality of said carrier pipes and a plurality of said feeder lines extend into the body of water and the filtered water is transferred through a lowermost filter pipeline of the horizontal well filter system.

13. The filtration system of claim 1, wherein said feeder line includes a double filter sock.

14. A reservoir filtration system comprising
a carrier pipe extending from land into a body of water,
a feeder line located inside of said carrier pipe, said feeder line being porous,
a horizontal well filter system, said carrier pipe and feeder line extending through said horizontal well filter system for transfer of water from the body of water into said horizontal well filter system to provide filtered water from the horizontal well filter system,
a cable system for moving the feeder line into and out of said carrier pipe, and
a horizontal well system including at least two vertically spaced filter pipelines separated by filter media.

* * * * *